(12) United States Patent
Shin et al.

(10) Patent No.: US 11,239,529 B2
(45) Date of Patent: Feb. 1, 2022

(54) FILM PRODUCTION METHOD

(71) Applicant: Sumitomo Chemical Company, Limited, Tokyo (JP)

(72) Inventors: Akihiko Shin, Daegu (KR); Yuji Takaoka, Niihama (JP); Atsushi Nakazawa, Niihama (JP); Hideyuki Sasaki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 186 days.

(21) Appl. No.: 16/599,167

(22) Filed: Oct. 11, 2019

(65) Prior Publication Data

US 2020/0044218 A1 Feb. 6, 2020

Related U.S. Application Data

(62) Division of application No. 15/278,706, filed on Sep. 28, 2016, now abandoned.

(30) Foreign Application Priority Data

Sep. 30, 2015 (JP) .................................. 2015-194109
Jan. 29, 2016 (JP) .................................. 2016-016002
Sep. 27, 2016 (JP) .................................. 2016-188319

(51) Int. Cl.
*H01M 2/14* (2006.01)
*H01M 50/403* (2021.01)
(Continued)

(52) U.S. Cl.
CPC ........... *H01M 50/403* (2021.01); *B32B 27/14* (2013.01); *C08J 7/043* (2020.01); *C08J 7/0427* (2020.01);
(Continued)

(58) Field of Classification Search
CPC ............ H01M 50/403; H01M 50/463; H01M 50/446; H01M 50/449; H01M 50/411;
(Continued)

(56) References Cited

U.S. PATENT DOCUMENTS

| | | | |
|---|---|---|---|
| 6,261,487 B1 | 7/2001 | Bongaerts et al. | |
| 2004/0052950 A1 | 3/2004 | Kondou et al. | |

(Continued)

FOREIGN PATENT DOCUMENTS

| | | |
|---|---|---|
| CN | 104011926 A | 8/2014 |
| CN | 104428921 A | 3/2015 |

(Continued)

OTHER PUBLICATIONS

Office Action dated Jun. 9, 2017 in KR Application No. 10-2016-0125428.

(Continued)

*Primary Examiner* — Jonathan G Jelsma
*Assistant Examiner* — Omar M Kekia
(74) *Attorney, Agent, or Firm* — Panitch Schwarze Belisario & Nadel LLP

(57) ABSTRACT

A desired drying capability is achieved while damage to a film is prevented. A film production method is arranged such that: a production process including a drying step is operated by setting a drying condition, under which to carry out the drying step, for each of at least two periods, the two periods being a first period and a second period later than the first period; the drying condition is changed in at least a part of the first period so as to be enhanced with time; and the drying condition is maintained in the second period so as to be substantially fixed.

8 Claims, 11 Drawing Sheets

(51) Int. Cl.
  *B32B 27/14* (2006.01)
  *C08J 7/04* (2020.01)
  *H01M 50/411* (2021.01)
  *H01M 50/446* (2021.01)
  *H01M 50/449* (2021.01)
  *H01M 50/463* (2021.01)
  *C08J 7/043* (2020.01)
  *H01M 10/0525* (2010.01)

(52) U.S. Cl.
  CPC ....... *H01M 50/411* (2021.01); *H01M 50/446* (2021.01); *H01M 50/449* (2021.01); *H01M 50/463* (2021.01); *C08J 2323/06* (2013.01); *C08J 2323/12* (2013.01); *C08J 2477/10* (2013.01); *H01M 10/0525* (2013.01)

(58) Field of Classification Search
  CPC .... H01M 10/0525; C08J 7/0427; C08J 7/043; C08J 2323/06; C08J 2323/12; C08J 2477/10; Y02E 60/10; Y02P 70/50; B32B 27/14
  USPC .......................................................... 429/247
  See application file for complete search history.

(56) References Cited

U.S. PATENT DOCUMENTS

| | | |
|---|---|---|
| 2007/0298234 A1 | 12/2007 | Oono et al. |
| 2009/0108487 A1 | 4/2009 | Suzuki et al. |
| 2011/0227248 A1 | 9/2011 | Oono et al. |
| 2013/0017431 A1* | 1/2013 | Frisk ................ H01M 50/411 429/145 |
| 2014/0308571 A1 | 10/2014 | Gaben et al. |
| 2014/0338824 A1 | 11/2014 | Takagi |
| 2014/0377630 A1 | 12/2014 | Kawakami et al. |
| 2015/0111109 A1 | 4/2015 | Yamada et al. |
| 2015/0194652 A1 | 7/2015 | Okihiro et al. |
| 2016/0006018 A1* | 1/2016 | Wang ................ H01M 10/0525 427/482 |
| 2016/0126520 A1 | 5/2016 | Mizuno et al. |
| 2019/0173129 A1 | 6/2019 | Gaben et al. |

FOREIGN PATENT DOCUMENTS

| | | |
|---|---|---|
| JP | 2000506795 A | 6/2000 |
| JP | 4169268 B2 | 10/2008 |
| JP | 2010203751 A | 9/2010 |
| JP | 2013101838 A | 5/2013 |
| JP | 2013108648 A | 6/2013 |
| JP | 2015130270 A | 7/2015 |
| KR | 20070107011 A | 11/2007 |
| KR | 2012-0121152 A | 11/2012 |
| KR | 101273992 B1 | 6/2013 |
| KR | 20140136391 A | 11/2014 |
| KR | 20140148320 A | 12/2014 |
| KR | 20150035504 A | 4/2015 |
| WO | 2014209021 A1 | 12/2014 |

OTHER PUBLICATIONS

Office Action dated Jan. 30, 2018 in KR Application No. 10-2016-0125428.

Office Action dated Oct. 15, 2018 in U.S. Appl. No. 15/278,706 by Shin.

Office Action issued Jun. 13, 2019 in U.S. Appl. No. 15/278,706 by Shin.

* cited by examiner

FILM PRODUCTION METHOD

CROSS-REFERENCE TO RELATED APPLICATION

This application is a Divisional of U.S. patent application Ser. No. 15/278,706 filed Sep. 28, 2016, which claims priority under 35 U.S.C. § 119(b) to Japanese Application No. 2015-194109 filed Sep. 30, 2015, Japanese Application No. 2016-016002 filed Jan. 29, 2016 and Japanese Application No. 2016-188319 filed Sep. 27, 2016, the disclosures of which are incorporated herein by reference in their entirety.

TECHNICAL FIELD

The present invention relates to a film production method, a separator film for a battery (hereinafter referred to as "a battery separator film"), a separator for a nonaqueous electrolyte secondary battery (hereinafter referred to as "a nonaqueous electrolyte secondary battery separator"), and a nonaqueous electrolyte secondary battery.

BACKGROUND ART

A production process for producing a film, especially a functional film includes various drying steps such as drying after washing and drying after coating.

In a case where a separator film to be used as a functional film in a lithium ion secondary battery is taken as an example, Patent Literature 1 discloses a technique for providing one side of a film with a layer for achieving higher heat resistance. Specifically, Patent Literature 1 discloses a technique for coating a film with a heat-resistant coating solution by use of a coating device and thereafter causing the coated film to pass through a drier so as to dry the coated film.

CITATION LIST

Patent Literature

Patent Literature 1
Japanese Patent Application Publication Tokukai No. 2015-130270 (Publication date: Jul. 16, 2015)

SUMMARY OF INVENTION

Technical Problem

In order to be used as a nonaqueous electrolyte secondary battery separator, a battery separator film is required to be handleable while being laminated to an electrode. Thus, the battery separator film is more preferably less deformed after being produced.

Examples of the deformation include deformation such that the battery separator film curls toward a functional layer due to drying. The functional layer herein means a layer (e.g., a heat-resistant layer) to be provided on a base material layer by, for example, coating so that a function is imparted to the film. The curling is mainly caused by (i) shrinkage in the functional layer during drying of the film after the coating and (ii) generation in the base material layer of a stress by which the film is to curl assuming that the functional layer side is an inner side.

A film to be produced by the technique disclosed in Patent Literature 1 may change in size of the curling (described earlier), i.e., curling amount from various causes.

(Steady Operation)

In a case where the production process (described earlier) is continuously operated (steadily operated), a film in a uniform state is continuously conveyed in the drying steps included in the production process. During the drying steps, a drying capability has a desired value and is substantially constant. Note that the above operation means that the film is conveyed while the production process is operated.

(Stoppage)

Note, however, that the production process may be stopped. The production process may be stopped due to, for example, replenishment of a film, addition of a raw material, takeout of a product, maintenance of the production process, or washing.

(Restart)

In a case where the production process is operated again (restarted) after the above stoppage, it is not easy to obtain, during the drying steps, a drying capability that is temporally uniform.

Specifically, during the drying steps, heat is taken away from a vicinity of a film as the film is dried. Thus, in order to obtain the drying capability that is temporally uniform, it is necessary to cause an amount of heat to be supplied to the drying steps and an amount of heat to be taken away in accordance with the drying of the film to be in an equilibrium state.

It is not easy to achieve this equilibrium state without damaging a film and from a lead of a product.

(Initial Operation)

Same as above also applies to a case that is not the case where the production process is restarted from the stoppage but a case where the production process is initially operated (the case of "initial operation"). As in the case of the restart, the initial operation has difficulty in obtainment of the drying capability that is temporally uniform.

Such nonuniformity in drying capability causes deformation in a film and a variation in the deformation. In a case where a curling amount widely varies depending on a position on a film, it is impossible to uniquely set a condition under which to laminate the film to an electrode. This makes it difficult to laminate the film to the electrode.

In view of the above, an object of the present invention is to easily achieve a desired drying capability while preventing damage to a film.

Solution to Problem

In order to attain the object, a film production method in accordance with an aspect of the present invention is a film production method including a drying step of drying a film, arranged such that: a production process including the drying step is operated by setting a drying condition, under which to carry out the drying step, for each of at least two periods, the two periods being a first period and a second period later than the first period; the drying condition is changed in at least a part of the first period so as to be enhanced with time; and the drying condition is maintained in the second period so as to be substantially fixed.

According to the feature, the drying condition is changed in the first period so as to be enhanced, and the drying condition is maintained in the second period so as to be fixed. This allows the film production method of an aspect of the present invention to easily achieve a desired drying capability while preventing damage to a film.

The film production method in accordance with an aspect of the present invention is preferably arranged such that a decline in drying capability demonstrated in the drying step, the decline being caused by absorption of heat during the drying of the film, is prevented by changing the drying condition in the first period so that the drying condition is enhanced.

According to the method, the drying condition is enhanced in the first period so that a decline in drying capability which decline is caused by absorption of heat due to the drying is prevented. This makes it possible to achieve a desired drying capability without fail.

The film production method in accordance with an aspect of the present invention is preferably arranged such that: the drying capability is maintained constant in the first period by changing the drying condition in the first period so that the drying condition is enhanced; the drying capability is maintained constant in the second period by causing the absorption of heat and application of heat to the drying step to reach equilibrium at an end of the first period; and the drying capability is consequently constant throughout the first period and the second period.

According to the method, the drying capability is maintained constant in the first period, and an amount of the absorption of heat due to the drying and an amount of the application of heat (i.e., supply of heat) to the drying step reach equilibrium at the end of the first period. This makes it possible to achieve a desired drying capability throughout the first period and the second period.

The film production method in accordance with an aspect of the present invention is preferably arranged such that a time at which the first period starts is set so that a lead part of the film which is to be formed into a product starts to be subjected to the drying step at the time.

According to the method, the drying condition starts to be enhanced at a timing at which the lead part of the film which is to be formed into a product is about to be subjected to the drying step. Thus, a good product having a uniform quality can be easily obtained from an initial portion of the product.

The film production method in accordance with an aspect of the present invention is preferably arranged such that: the drying is carried out by bringing the film into contact with a roller that is heated; and the drying condition is a temperature of a heating medium to be poured into the roller.

According to the method, the drying condition is a temperature of a heating medium to be poured into the roller. This makes it possible to easily set the drying condition.

The film production method in accordance with an aspect of the present invention is preferably arranged such that the operation of the production process is a restart of the production process which is stopped.

According to the method, it is possible to easily achieve a desired drying capability in restarting the production process after the stoppage.

The film production method in accordance with an aspect of the present invention is preferably arranged such that the film is a battery separator.

According to the method, during production of a battery separator in which a film is easily damaged, it is possible to easily achieve a desired drying capability while preventing damage to the battery separator.

The film production method in accordance with an aspect of the present invention is preferably arranged such that in the drying step, deformation in the film is prevented by carrying out a heat treatment so as to cause shrinkage not only in a functional layer of the film but also in a base material of the film.

According to the method, shrinkage in the base material of the film allows less deformation in the film which deformation is caused by shrinkage in the functional layer.

A battery separator film in accordance with an aspect of the present invention is arranged such that: in a case where a curling amount W is found at 12 positions which are arranged in a longer side direction of the battery separator film at intervals of an integral multiple of 100 m and in which a distance between positions that are most distant from each other is not shorter than 100 m and not longer than 300 m, a coefficient of variation a with respect to the found curling amount W is not more than 0.15, the curling amount W being represented by the following equation (1):

$$\text{curling amount } W = W1 - W2 \quad (1)$$

where W1 is a width of a film that has been cut out in the longer side direction, and W2 is a projection width of a part of the film which part is smallest in projection width when seen from a direction perpendicular to a surface of the film while the film, to which a tension of 90 N/m is applied, is stretched between two rollers that are provided in parallel with each other at intervals of 27.5 cm, and the coefficient of variation a being represented by the following equation (2):

$$\text{coefficient of variation } \sigma = \text{standard deviation of curling amount } W/\text{average of curling amount } W \quad (2)$$

According to the arrangement, deformation in the film less varies depending on a position on the film. This makes it possible to reduce need to appropriately adjust handling of the film in accordance with the curling amount so as to laminate the film to an electrode.

The battery separator film in accordance with an aspect of the present invention is preferably arranged such that the curling amount W which is found for a length of not shorter than 100 m and not longer than 2000 m has a maximum value of not more than 0.3 at any of positions that are arranged in the longer side direction at intervals of 100 m.

According to the arrangement, the film, which is less deformed, can be more handleable while being laminated to an electrode.

A battery separator film in accordance with an aspect of the present invention can be suitably used in a nonaqueous electrolyte secondary battery separator.

A nonaqueous electrolyte secondary battery separator in accordance with an aspect of the present invention can be suitably used in a nonaqueous electrolyte secondary battery.

Advantageous Effects of Invention

A film production method of an aspect of the present invention yields an effect of easily achieving a desired drying capability while preventing damage to a film.

DESCRIPTION OF EMBODIMENTS

An embodiment of the present invention is described below by taking a lithium ion secondary battery separator film (which may be referred to as a "separator") as an example.

Note that the present invention is applicable not only to drying during production of a lithium ion secondary battery separator film but also to drying during production of a film different from the lithium ion secondary battery separator film.

Embodiment 1

First, a lithium ion secondary battery is described below with reference to FIGS. 1 through 3.

(Arrangement of Lithium Ion Secondary Battery)

A nonaqueous electrolyte secondary battery typified by a lithium ion secondary battery has a high energy density. Thus, such a nonaqueous electrolyte secondary battery is currently widely used not only as a battery for use in (i) devices such as a personal computer, a mobile phone, and a mobile information terminal, and (ii) movable bodies such as an automobile and an airplane, but also as a stationary battery contributive to stable electric power supply.

Figure 1:
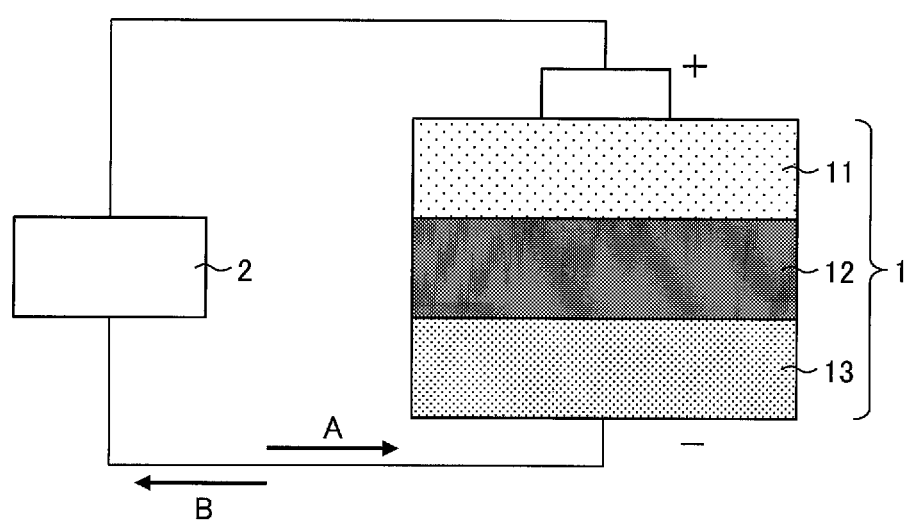
FIG. 1 schematically illustrates an arrangement of a cross section of a lithium ion secondary battery.

FIG. 1 schematically illustrates an arrangement of a cross section of a lithium ion secondary battery 1.

As illustrated in FIG. 1, the lithium ion secondary battery 1 includes a cathode 11, a separator 12, and an anode 13. Between the cathode 11 and the anode 13, an external device 2 is connected outside the lithium ion secondary battery 1. While the lithium ion secondary battery 1 is being charged, electrons move in a direction A. Meanwhile, while the lithium ion secondary battery 1 is being discharged, electrons move in a direction B.

(Separator)

The separator 12 is provided so as to be sandwiched between the cathode 11 and the anode 13, which are a positive electrode and a negative electrode, respectively, of the lithium ion secondary battery 1. While separating the cathode 11 and the anode 13, the separator 12 allows lithium ions to move between the cathode 11 and the anode 13. The separator 12 contains, for example, polyolefin (e.g., polyethylene or polypropylene) as a material thereof.

Figure 2:
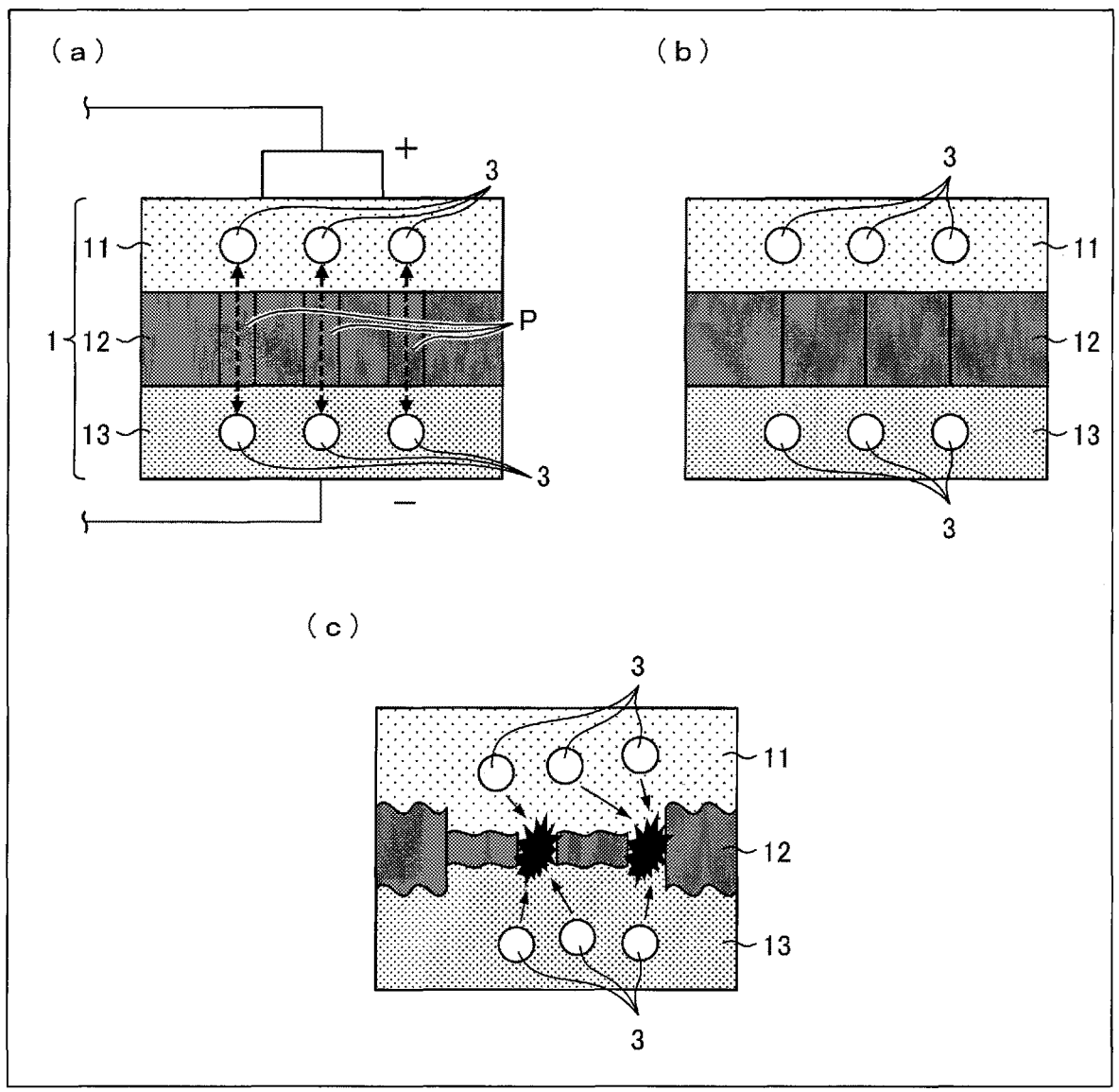
FIG. 2 schematically illustrates states of the lithium ion secondary battery illustrated in FIG. 1.

FIG. 2 schematically illustrates states of the lithium ion secondary battery 1 illustrated in FIG. 1. (a) of FIG. 2 illustrates a normal state of the lithium ion secondary battery 1. (b) of FIG. 2 illustrates a state in which the lithium ion secondary battery 1 has increased in temperature. (c) of FIG. 2 illustrates a state in which the lithium ion secondary battery 1 has sharply increased in temperature.

As illustrated in (a) of FIG. 2, the separator 12 is provided with many pores P. Normally, lithium ions 3 in the lithium ion secondary battery 1 can move back and forth through the pores P.

Note here that there may be, for example, a case where the lithium ion secondary battery 1 increases in temperature due to, for example, overcharge of the lithium ion secondary battery 1 or a large current caused by a short circuit having occurred in the external device. In such a case, the separator 12 melts or softens, and the pores P are blocked (see (b) of FIG. 2). As a result, the separator 12 shrinks. This stops the movement of the lithium ions 3, and consequently stops the increase in temperature (described earlier).

Note, however, that the separator 12 suddenly shrinks in a case where the lithium ion secondary battery 1 sharply increases in temperature. In this case, as illustrated in (c) of FIG. 2, the separator 12 may be broken. Then, the lithium ions 3 leak out from the separator 12 which has been broken, so that the lithium ions 3 do not stop moving back and forth. Thus, the increase in temperature continues.

(Heat-Resistant Separator)

Figure 3:
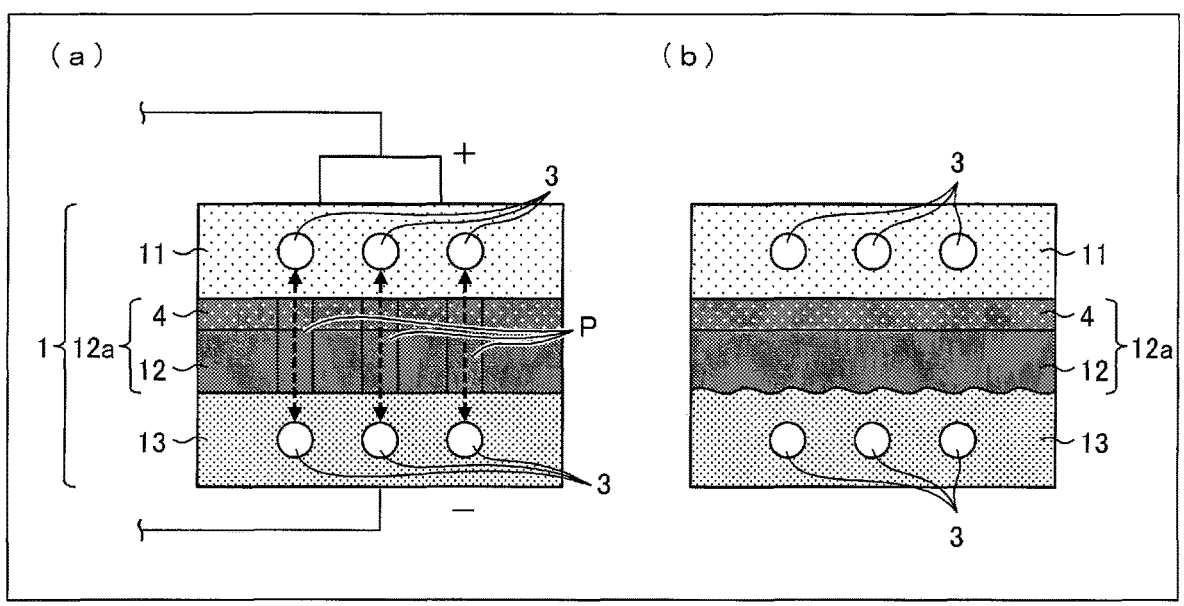
FIG. 3 schematically illustrates states of the lithium ion secondary battery which has another arrangement.

FIG. 3 schematically illustrates states of the lithium ion secondary battery 1 which has another arrangement. (a) of FIG. 3 illustrates a normal state of the lithium ion secondary battery 1. (b) of FIG. 3 illustrates a state in which the lithium ion secondary battery 1 has sharply increased in temperature.

As illustrated in (a) of FIG. 3, the lithium ion secondary battery 1 can further include a heat-resistant layer 4. The heat-resistant layer 4 can be provided to the separator 12. (a) of FIG. 3 illustrates an arrangement in which the heat-resistant layer 4, which serves as a functional layer, is provided to the separator 12. In the following description, as an example of a functional layer-attached separator, a film in which the heat-resistant layer 4 is provided to the separator 12 is regarded as a heat-resistant separator 12a. Further, in the following description, the separator 12 of the functional layer-attached separator is regarded as a base material with respect to the functional layer.

According to the arrangement illustrated in (a) of FIG. 3, the heat-resistant layer 4 is laminated to one side of the separator 12 which one side faces the cathode 11. Alternatively, the heat-resistant layer 4 can be laminated to one side of the separator 12 which one side faces the anode 13, or to both sides of the separator 12. Further, the heat-resistant layer 4 is provided with pores that are similar to the pores P. Normally, the lithium ions 3 move back and forth through the pores P and the pores of the heat-resistant layer 4. The heat-resistant layer 4 contains, for example, wholly aromatic polyamide (aramid resin) as a material thereof.

As illustrated in (b) of FIG. 3, even in a case where the lithium ion secondary battery 1 sharply increases in temperature and the separator 12 melts or softens, a shape of the separator 12, which is supported by the heat-resistant layer 4, is maintained. Thus, such a sharp increase in temperature merely results in melting or softening of the separator 12 and consequent blocking of the pores P. This stops the movement of the lithium ions 3 and consequently stops overdischarge or overcharge (described earlier). The separator 12 is thus prevented from being broken.

(Flow of Production of Functional Layer-Attached Separator)

The following description discusses a flow of production of a functional layer-attached separator (functional film).

Figure 4:
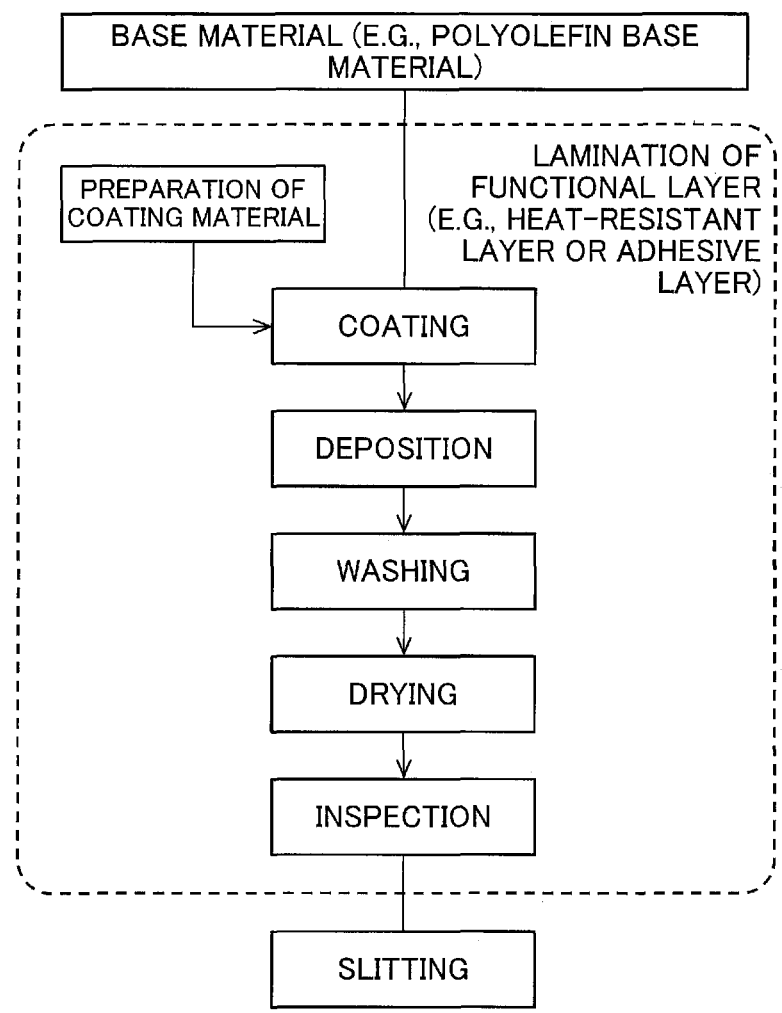
FIG. 4 shows a flow of production of a functional layer-attached separator.

FIG. 4 is a flow diagram schematically showing a process for producing the functional layer-attached separator.

The functional layer-attached separator is arranged to include a functional layer that is laminated to a separator serving as a base material.

As the base material, a film made of, for example, polyolefin is used. The functional layer is exemplified by a heat-resistant layer and an adhesive layer.

The heat-resistant layer can be made of a material that is exemplified by aromatic polyamide such as aramid resin. The adhesive layer can be made of a material that is exemplified by fluorine-based resin such as polyvinylidene fluoride.

The functional layer is laminated to the base material by coating the base material with, for example, a coating material that is suited to the functional layer, and drying the coated base material.

FIG. 4 illustrates a flow of production of a heat-resistant separator in a case where the functional layer is a heat-resistant layer. According to the illustrated flow, wholly aromatic polyamide (aramid resin), which is used as a material of which the heat-resistant layer is made, is laminated to a polyolefin base material.

This flow includes the steps of coating, deposition, washing, and drying. The heat-resistant layer which has been laminated to the base material is subjected to inspection and subsequent slitting.

(Process for Producing Functional Layer-Attached Separator)

The following description discusses steps included in the process for producing the functional layer-attached separator.

A process for producing a heat-resistant separator which includes, as the functional layer, a heat-resistant layer made of aramid resin includes the following steps (a) through (h).

Specifically, the process for producing the heat-resistant separator includes (a) a base material (separator) unwinding and inspecting step, (b) a coating material (functional material) coating step, (c) a deposition step carried out by, for example, humidity deposition, (d) a washing step, (e) a water removing step, (f) a drying step, (g) a coated article inspecting step, and (h) a winding step that are carried out in this order. Alternatively, the process for producing the heat-resistant separator may include not only the above steps (a) through (h) but also a base material producing (film-forming) step provided before the (a) base material unwinding and inspecting step, and/or a slitting step provided after the (h) winding step.

The process for producing the functional layer-attached separator does not need to include all the steps (a) through (h). For example, a process for producing a heat-resistant separator which includes, as the functional layer, a heat-resistant layer made of ceramics and binder resin includes the steps (a), (b), and (f) through (h) and does not include the steps (c), (d), and (e). In this case, in the (f) drying step, the functional layer is formed by being deposited.

The following description discusses the base material producing step, which is a step carried out preliminarily to the step (a), and then discusses the steps (a) through (h) in this order.

(Base Material Producing Step)

The following description discusses production of a separator original sheet film as a base material by taking, as an example, a case where the separator original sheet film mainly contains polyethylene as a material thereof.

A production method to be taken as an example is exemplified by a method in which a film is formed by adding a solid or liquid pore-forming agent to thermoplastic resin and then the pore-forming agent is removed by use of an appropriate solvent. Specifically, the base material which is made of polyethylene resin containing ultrahigh-molecular-weight polyethylene is produced through the following steps (A) through (D) carried out in this order.

(A) Kneading Step

A (A) kneading step is a step of obtaining a polyethylene resin composition by kneading ultrahigh-molecular-weight polyethylene and an inorganic filler such as calcium carbonate.

(B) Sheet Forming Step

A (B) sheet forming step is a step of forming a film by use of the polyethylene resin composition obtained in the kneading step.

(C) Removal Step

A (C) removal step is a step of removing the inorganic filler from the film obtained in the sheet forming step.

(D) Drawing Step

A (D) drawing step is a step of obtaining the base material by drawing the film obtained in the removal step.

According to the above production method, many micropores are provided in the film in the (C) removal step. Then, micropores in the film which has been drawn by the (D) drawing step serve as the pores P (described earlier). With this, the base material which is a polyethylene microporous film having a given thickness and a given air permeability is formed. Note that an order in which the (C) removal step and the (D) drawing step are carried out can be reversed.

In the (A) kneading step, it is possible to knead 100 parts by weight of the ultrahigh-molecular-weight polyethylene, 5 parts by weight to 200 parts by weight of low-molecular-weight polyolefin having a weight average molecular weight of not more than 10,000, and 100 parts by weight to 400 parts by weight of the inorganic filler.

Note that the base material which contains material(s) besides the above materials can also be produced by a production process similar to the above production process. Note also that the method for producing the base material is not limited to the above method, in which the pore-forming agent is removed, and various methods can be used to produce the base material.

Subsequently, the following description discusses the steps (a) through (h) in this order, the steps (a) through (h) following the base material producing step. Note that though the steps (a) through (h) proceed in this order, these steps can be partially omitted depending on a kind of functional material.

(a) Base Material Unwinding and Inspecting Step

The (a) base material unwinding and inspecting step includes (i) a step of unwinding, from a roller, the separator original sheet film serving as the base material of the functional layer-attached separator and (ii) a step of inspecting the unwound base material in advance of the subsequent coating step.

(b) Coating Material Coating Step

The (b) coating material coating step is a step of coating, with a coating material as the functional material, the base material which has been unwound in the step (a).

The following description discusses a method for laminating, to the base material, the heat-resistant layer serving as the functional layer. Specifically, the base material is coated with a coating material which serves as a coating material for the heat-resistant layer and in which alumina particles are dispersed in an NMP (N-methyl-pyrrolidone) solution of aramid. Note that the heat-resistant layer is not limited to the above aramid heat-resistant layer. For example, the base material can be coated with a coating material which serves as a coating material for the heat-resistant layer and in which alumina particles are dispersed in an aqueous carboxymethylcellulose solution.

A method for coating the base material with a coating material is not particularly limited provided that uniform wet coating can be carried out by the method. The method can be exemplified by various methods such as a capillary coating method, a slit die coating method, a spray coating method, a dip coating method, a roller coating method, a screen printing method, a flexo printing method, a bar coater method, a gravure coater method, and a die coater method.

The heat-resistant layer 4 has a thickness which can be controlled by adjusting a thickness of a coating wet film, a solid-content concentration represented by a sum of (i) a concentration of a binder contained in a coating solution and (ii) a concentration of a filler contained in the coating solution, and/or a ratio of the filler to the binder. Note that the functional layer can be provided on only one side of the base material or on both sides of the base material.

(c) Deposition Step (Humidity Deposition Step)

The (c) deposition step is a step of depositing the coating material with which the base material has been coated in the step (b). In a case where the coating material is an aramid coating material, aramid is deposited by, for example, providing a coating surface with humidity. The aramid heat-resistant layer is thus formed on the base material.

(d) Washing Step

The (d) washing step is a step, carried out after the deposition, of washing the functional layer and the base material. In a case where the functional layer is the aramid heat-resistant layer, water, an aqueous solution, or an alcoholic solution, for example is suitably used as a washing liquid.

(e) Water Removing Step

The (e) water removing step is a step of carrying out water removal with respect to the functional layer-attached separator which has been washed in the step (d).

Water removal is carried out to (i) remove, before the functional layer-attached separator starts to be subjected to the following drying step, the washing liquid (e.g., water) which has adhered to the functional layer-attached separator, (ii) make it easy to dry the functional layer-attached separator, and (iii) prevent the functional layer-attached separator from being insufficiently dried.

(f) Drying Step

The (f) drying step is a step of drying the functional layer-attached separator which has been subjected to water removal.

A method for drying the functional layer-attached separator is exemplified by but not particularly limited to various methods such as a method of bringing the functional layer-attached separator into contact with a heated roller, and a method of blowing hot air on the functional layer-attached separator.

(g) Coated Article Inspecting Step

The (g) coated article inspecting step is a step of inspecting the dried functional layer-attached separator. In a case where a defective part is appropriately marked during the inspection, it is possible to easily grasp a position of a defect included in a product.

(h) Winding Step

The (h) winding step is a step of winding the functional layer-attached separator which has been inspected.

The winding can be carried out by appropriately using, for example, a cylindrical core.

The wound functional layer-attached separator can be, for example, shipped, as it is, in a broad state and in a form of an original sheet. Alternatively, if necessary, the wound functional layer-attached separator can be formed into a slit separator by being slit so as to have a predetermined width.

(Drying Step)

The present invention relates to the drying step of the above steps.

As described earlier, the process for producing the functional layer-attached separator includes the (f) drying step. The (f) drying step is carried out to remove, by drying, the washing liquid which has adhered to the functional layer-attached separator in the (d) washing step, or a solvent contained in the coating material with which the base material has been coated in the (b) coating material coating step.

Means for carrying out the drying can be exemplified by but not particularly limited to roller heating. The roller heating is a method for drying the functional layer-attached separator by bringing the functional layer-attached separator into contact with a heated roller. A method for heating a roller is exemplified by a method of pouring a heating medium such as warm water into the roller and circulating the heating medium.

In the drying step, heat is taken away from a vicinity of the functional layer-attached separator while the washing liquid which has, for example, adhered to the functional layer-attached separator is volatilizing. In a case where the drying is carried out by the roller heating, the heat is taken away from the roller, so that the roller normally decreases in temperature.

(Drying Condition and Drying Capability)

The above phenomenon which occurs in the drying step is as described below in terms of a drying condition and a drying capability.

Note here that the drying condition is a condition that is set for the drying step to determine a strength at which the drying is carried out in the drying step. Note also that the drying capability is a capability, demonstrated in the drying step, to provide a film with heat.

As described earlier, heat is taken away from, for example, the roller in the drying step in accordance with the drying. Thus, for example, even in a case where the drying condition is fixed, a drying capability to be obtained may decline without being constant.

(Steady Operation)

In a case where the production process is steadily operated, an amount of heat to be applied to the roller and an amount of heat to be taken away from the roller are in an equilibrium (balanced) state. Thus, the roller has a substantially constant temperature. That is, a constant drying capability is obtained with respect to a fixed drying condition.

A state in which the roller has a substantially constant temperature herein normally refers to a state in which an amount of change in temperature of the roller is maintained so as to fall within 3° C.

(Restart from Stopped State)

In contrast, in a case where the production process is stopped for some reason and then is operated again, an amount of heat to be taken away from the roller and an amount of heat to be applied to the roller need to be in the equilibrium state again so that roller has a constant temperature. This is specifically described below.

Conventional Example

Figure 5:
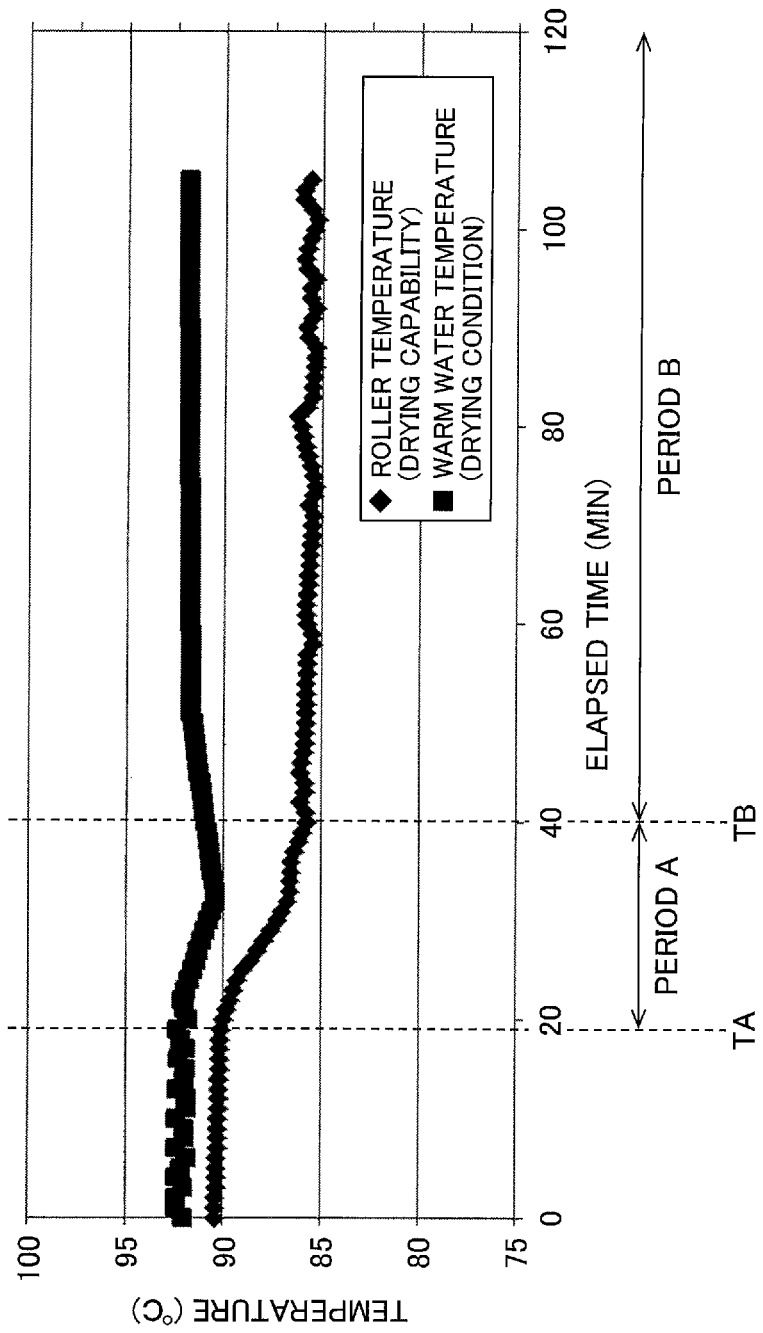
FIG. 5 shows a warm water temperature and a roller temperature of Conventional Example.

FIG. 5 shows a roller temperature and a warm water temperature of Conventional Example in roller heating.

Note here that the roller temperature is a temperature of a roller for use in roller heating, whereas the warm water temperature is a temperature of warm water to be poured into the roller and is equivalent to a temperature of the heating medium.

Note that for convenience of measurement, the warm water temperature of FIG. 5 is shown by regarding a temperature of warm water which temperature has been measured at a point at which the warm water is discharged from the roller as a temperature of warm water to be poured into the roller.

In this example, the warm water temperature corresponds to the drying condition (described earlier), and the roller temperature corresponds to the drying capability (described earlier).

(Each Period)

In FIG. 5, a horizontal axis shows an elapsed time (min), and a vertical axis shows a temperature (OC).

A time TA shows a time at which the roller temperature starts decreasing, and a time TB shows a time at which the roller temperature is made substantially constant.

A period A shows a period from the time TA to the time TB, and a period B shows a period at and after the time TB. Specifically, the period A shows a period that lasts until the roller temperature is made substantially constant after the production process is restarted, and the period B shows a period in which the roller temperature is substantially constant.

Conventionally, the roller temperature typically changes as below after the restart.

(Period A)

As shown in FIG. 5, the roller temperature is 90° C. at the time TA (19 min) after the restart, and thereafter gradually decreases. Then, at the time TB (40 min), the roller temperature reaches 86° C. That is, in the period A, the roller temperature is not constant but decreases.

This is because in a case where the film to which the washing liquid has adhered starts to be subjected to the drying step, the roller temperature decreases by a contact between the wet film and the roller, and heat is taken away from the roller in a form of heat of vaporization while the washing liquid is being dried.

(Period B)

In the period A, an amount of heat to be taken away from the roller and an amount of heat to be applied to the roller are in the equilibrium state. As a result, the roller temperature is constant in the period B at and after the time TB.

Note, however, that the roller temperature in the period B decreases from the roller temperature of 90° C. at the time TA and reaches 86° C.

In the example shown in FIG. 5, the warm water temperature, i.e., the temperature of the warm water to be poured into the roller is constant at 92° C. throughout the period A and the period B.

Note here that in FIG. 5, the warm water temperature temporarily decreases at an elapsed time of approximately 30 minutes. This is because as described earlier, the warm water temperature of FIG. 5 is shown by regarding a temperature of warm water which temperature has been measured at a point at which the warm water is discharged from the roller as a temperature of warm water to be poured into the roller.

Specifically, according to the present Conventional Example, at and after the time TA (19 min), the film to which the washing liquid (or the solvent) has adhered starts to be subjected to the drying step. Then, the roller temperature sharply decreases by the contact between the wet film and the roller, and a temperature of warm water in the roller decreases accordingly. Thus, the temperature of warm water which temperature has been measured at a point at which the warm water is discharged from the roller decreases.

Note, however, that as described earlier, a temperature of warm water to be poured into the roller is constant at 92° C. throughout the period A and the period B in the present Conventional Example.

(Problems)

As described earlier, according to the Conventional Example, it is impossible to obtain a constant roller temperature in the period A. Thus, an amount of heat to which a film is subjected to during the drying step varies depending on an anteroposterior position on the film.

Further, in the period B, the roller temperature, which is constant, is a temperature to which the roller temperature at the restart has decreased. This makes it impossible to provide the film with a desired amount of heat.

As described earlier, according to the Conventional Example, the first half and the second half of the film differ in amount of heat to which the film is subjected to during the drying step, and even after a heat amount is made constant, that heat amount differs from a desired heat amount.

This causes a problem of failure to obtain a film that uniformly has a desired physical property.

Further, according to the Conventional Example, drying is carried out at a temperature that is made lower than a desired temperature. This makes it impossible to obtain a desired drying capability.

With this, no curling that is caused by shrinkage in the base material may be prevented in a case where a desired drying condition is set but no necessary drying capability can be obtained and no heat treatment that is necessary for shrinkage in the base material (described later) is carried out.

Embodiment

The following description discusses an embodiment of the present invention.

(Outline)

A feature of the present embodiment is that a drying condition to be set for a drying step is unfixed.

Specifically, after the drying step is restarted, the drying condition is gradually enhanced during a given period, and then the drying condition is fixed. That is, a process for enhancing the drying condition with time is contained in a part of times into which a time during which the drying step is operated has been divided.

With the arrangement, a constant drying capability is obtained throughout a time during which the film which is to be formed into a product is subjected to the drying step.

Figure 6:
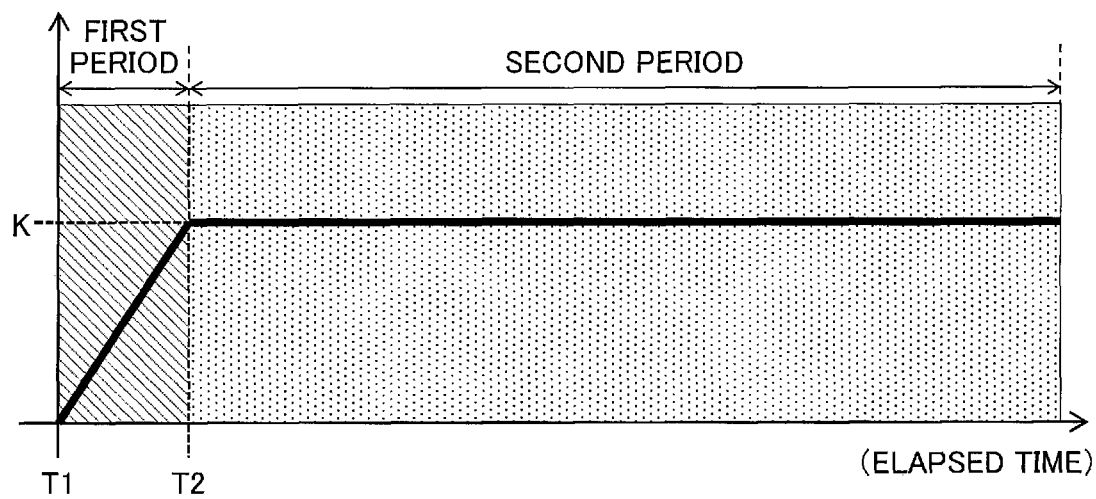
FIG. 6 shows a concept of a drying condition of Example.

FIG. 6 shows a concept of the drying condition of the present embodiment.

In FIG. 6, a horizontal axis shows an elapsed time, and a vertical axis shows a drying condition.

A time T1 on the horizontal axis shows a time at which the drying condition starts to be changed, and a time T2 on the horizontal axis shows a time at which the drying condition is fixed.

A first period shows a period from the time T1 to the time T2, and a second period shows a period at and after the time T2. Specifically, the first period shows a period in which the drying condition is changed after the production process is restarted, and the second period shows a period in which the drying condition is substantially fixed.

A state in which the drying condition is substantially fixed herein refers to, for example, a state in which an amount of change in warm water temperature is maintained so as to fall within 3° C.

As shown in FIG. 6, according to the present embodiment, the drying condition is gradually enhanced until the time T2 after the drying step is restarted.

Note here that in the drying step, the time T2 corresponds to a time at which a heat amount achieves an equilibrium state. Specifically, as described earlier, in the drying step, there exist (i) heat that is externally applied and (ii) heat that is taken away by, for example, heat of vaporization which heat is generated during drying of the washing liquid (or the solvent). In a case where an amount of heat to be applied and an amount of heat to be taken away are balanced, the above equilibrium state is achieved, so that a drying capability is made constant in the drying step.

According to the present embodiment, the drying condition is enhanced until the equilibrium state is achieved, and then the equilibrium state is achieved at the time T2.

In this case, a drying condition K at the time T2 is a drying condition under which a desired drying capability can be obtained in the equilibrium state.

Specific Example

Figure 7:
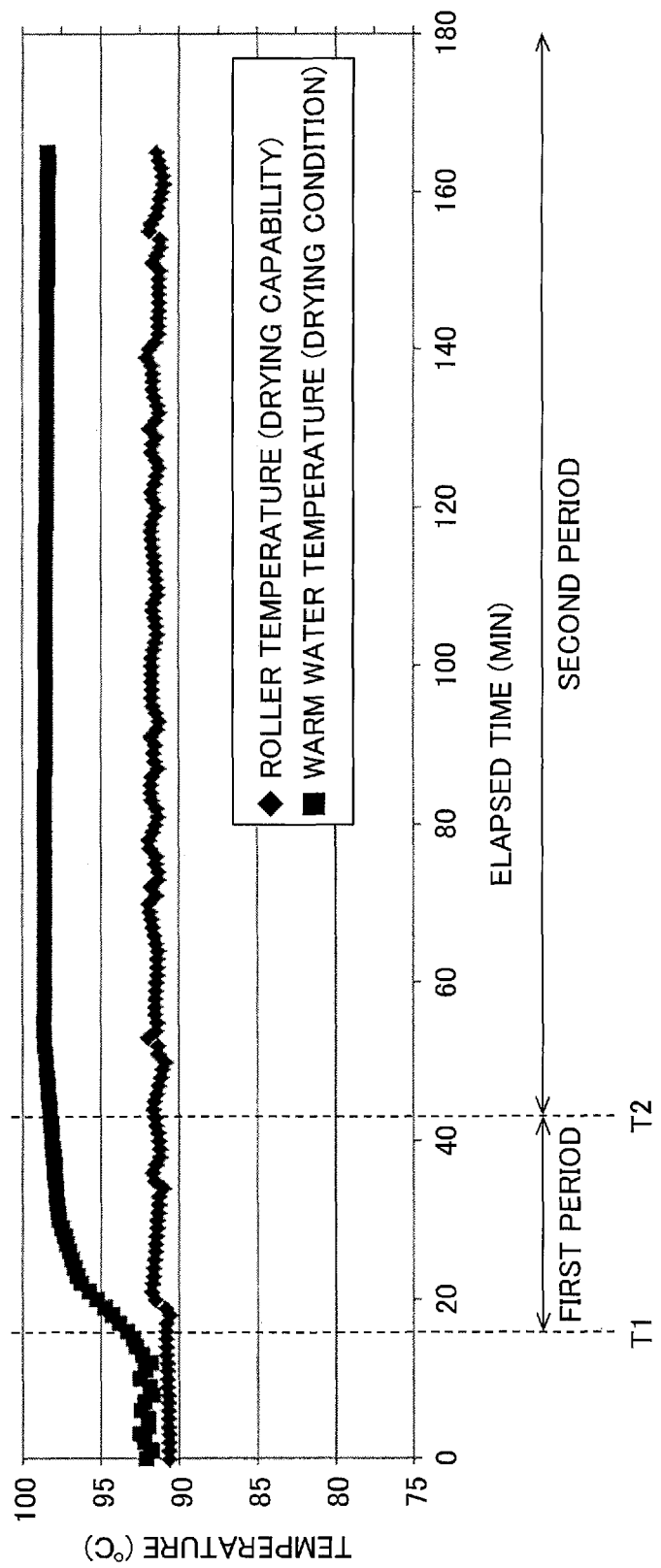
FIG. 7 shows a warm water temperature and a roller temperature of Example.

The following description specifically discusses the present embodiment with reference to FIG. 7.

FIG. 7 shows a warm water temperature and a roller temperature of the present embodiment. Note that as in the case of the warm water temperature of FIG. 5, the warm water temperature of FIG. 7 is shown by regarding a temperature of warm water which temperature has been measured at a point at which the warm water is discharged from the roller as a temperature of warm water to be poured into the roller.

As in the case of FIG. 5, in FIG. 7, a horizontal axis shows an elapsed time (min), and a vertical axis shows a temperature (° C.).

For each time of FIG. 7, as in the case of FIG. 6, the time T1 shows a time at which the drying condition starts to be changed, and the time T2 shows a time at which the drying condition is fixed.

As in the case of FIG. 6, the first period shows a period from the time T1 to the time T2, i.e., a period in which the drying condition is changed after the production process is restarted. The second period shows a period at and after the time T2, i.e., a period in which the drying condition is substantially fixed.

(First Period)

The warm water temperature serving as the drying condition is approximately 92° C. at the time T1 (15 min), at which the first period starts. Thereafter, the warm water temperature is increased to approximately 98° C. at the time T2 (42 min), at which the first period ends.

As a result, in the first period, the roller temperature serving as the drying capability is substantially constant at a temperature between approximately 91° C. and 92° C.

(Second Period)

In the second period, the warm water temperature and the roller temperature are both substantially constant from the time T2, at which the second period starts.

Specifically, by causing the warm water temperature to be constant at 98° C., the roller temperature is made substantially constant at 92° C., which is a desired roller temperature.

(Conclusion)

As described earlier, according to the present embodiment, a desired roller temperature is obtained throughout the first period and the second period.

This is (i) because in the first period, a decline in drying capability is prevented by gradually enhancing the drying condition and consequently the drying capability is maintained substantially constant and (ii) because the heat amount achieves the equilibrium state in the drying step at an end of the first period.

A state in which the drying capability is constant refers to, for example, a state in which an amount of change in roller temperature is maintained so as to fall within 3° C. According to an aspect of the present invention, an amount of change in roller temperature serving as the drying capability is maintained so as to fall preferably within 2° C., more preferably within 1° C.

(Effect)

According to the present embodiment, a desired roller temperature is achieved throughout the first period and the second period. Thus, by causing a lead part of a film which is to be formed into a product to start to be subjected to the drying step at the time T1, at which the first period starts, it is possible to obtain a uniform film characteristic even from an initial portion of the product.

Further, according to the present embodiment, the warm water temperature is increased in the first period so that the roller temperature is maintained constant. Thus, for example, there occurs no excessive drying that occurs at an early stage of drying in a case where the drying capability is set in advance to be slightly higher in expectation of a decline in drying capability in the period A of FIG. 5.

Another Example: Temperature Increase Pattern

According to the present embodiment, as shown in FIG. 7, the warm water temperature is increased so as to be curved.

Note, however, that how to increase the warm water temperature in the first period is not limited to the above. For example, it is also possible to gradually or linearly increase the warm water temperature. That is, it is only necessary to control the warm water temperature so that a decrease in roller temperature is prevented after the restart of the production process and consequently the roller temperature is maintained constant. How to carry out such control can be appropriately determined in accordance with, for example, a kind of the washing liquid (or the solvent), an amount of adhesion of the washing liquid (or the solvent), and/or a conveyance speed of the film.

As described earlier, it is only necessary to control the warm water temperature so that the roller temperature is maintained constant. Note, however, that for example, in a case where the greatest change in warm water temperature occurs, the warm water temperature preferably increases at a speed of 0.5° C./min to 2° C./min. The control of the warm water temperature preferably includes a temperature increase pattern in which an increase in warm water temperature by 1° C. to 20° C. per 10 minutes occurs, and more preferably includes a temperature increase pattern in which an increase in warm water temperature by 1° C. to 10° C. per 10 minutes occurs.

Another Example: Drying Means and Drying Condition Setting Means

The present embodiment has taken, as an example, an arrangement in which the drying condition is set by use of the temperature of the heating medium to be poured into the roller. Note, however, means for setting the drying condition is not limited to the above. For example, the drying condition can also be set by use of, for example, a flow rate of the heating medium to be poured into the roller.

Further, drying means is not limited to the roller heating, i.e., the drying carried out by bringing the film into contact with a heating medium circulating roller. For example, the drying can also be carried out by use of, for example, hot air drying or far infrared radiation heating.

In addition, in a case where the drying means is changed, the means for setting the drying condition can be appropriately changed accordingly. For example, in the case of the hot air drying, the drying condition can be set by use of, for example, a temperature, a volume, a speed, and/or a direction of hot air. Meanwhile, in the case of the far infrared heating, the drying condition can be set by use of an output intensity of a far infrared ray.

Another Example: Target Scene

The present embodiment has discussed a scene in which the production process is restarted from its stopped state. Note, however, that a scene to which the present invention is applicable is not limited to the above scene. For example, the present invention is widely applicable to a scene in which the production process is operated from its stopped state, e.g., a scene of initial operation in which scene the production process is initially operated.

Another Example: Target Film

The present embodiment has been described by taking a functionalized battery separator as an example. Note, however, that a film to which the present invention is applicable is not limited to the above battery separator. The present invention is widely applicable to any film that is subjected to the drying step.

The above battery separator can be an elongated battery separator obtained by linking a plurality of battery separators in a longer side direction.

Another Example: Target Step

The present embodiment has been described by taking, as an example, the drying step carried out after the washing step. Note, however, a drying step to which the present invention is applicable is not limited to the above drying step. For example, the present invention is widely applicable to a step of applying heat to an object to be heated, such as a drying step carried out after coating, a drying step carried out after deposition, a drying step carried out with no water removing step carried out after washing, or an aging heating step.

Example of Stoppage 1

The following description more specifically discusses an example of control of the warm water temperature.

A case where the production process is stopped is roughly divided into the following two cases: (i) a case where the production process is scheduled to be stopped; and (ii) a case where the production process is not scheduled to be stopped.

First, as an example of stoppage 1, stoppage in the case where the production process is scheduled to be stopped is described below.

Typical examples of the example of stoppage 1 include stoppage for regular maintenance and/or inspection, stoppage for replacement of unwinding and winding rollers, and the like.

According to the example of stoppage 1, in a case where the production process is stopped, a dummy film is normally allowed to pass through the production process. Specifically, in a case where the process for producing the functional layer-attached separator (described earlier) is taken as an example, a dummy film is allowed to pass through the (a) base material unwinding and inspecting step through the (h) winding step so as to save trouble of allowing the dummy film to pass through the production process in a case where the production process is restarted.

Thus, after the production process is restarted, a lead part of a separator original sheet film serves as a lead of a product. That is, a part of the separator original sheet film which part is connected to an extreme rear end of the dummy film serves as the lead of the product.

Given these circumstances, in a case where the production process is restarted, the time T1 is set at a time at which the lead part starts to be subjected to the drying step.

The arrangement makes it possible to obtain a uniform film characteristic from the lead part.

Note that the time T1 can also be set at a time different from the time at which the lead part starts to be subjected to the drying step. For example, the time T1 can also be set at a time at which a position on the film which position is posterior to the lead part starts to be subjected to the drying step. Specifically, the time T1 can be set at a time at which a part of the film in which part a thickness of the coating material with which the base material has been coated in the (b) coating material coating step is made stable, or a part of the film in which part a thickness of the functional layer which has been subjected to the (c) deposition step is made stable starts to be subjected to the drying step. With the arrangement, in a case where the film in which the thickness is made stable is formed into a product, it is possible to more efficiently obtain the product.

Example of Stoppage 2

Next, an example of stoppage 2 is described below. The example of stoppage 2 is stoppage in the case where the production process is not scheduled to be stopped.

Typical examples of the example of stoppage 2 include stoppage caused by occurrence of an unexpected abnormality (e.g., cutting of the film) in the production process.

In this case, the production process is stopped while the separator original sheet film, which is the film for a product, is allowed to pass through the production process. That is, unlike the example of stoppage 1, according to the example of stoppage 2, the production process is not stopped while the dummy film is allowed to pass through the production process.

Note, however, that the film which is being subjected to the production process when the production process is stopped is normally disposed of without being formed into a product. This is because the film which is being subjected to the production process cannot be said to have been produced under a condition similar to a condition under which the film is produced during the steady operation of the production process.

Thus, after the production process is restarted, a part of the film which part was being subjected to the (a) base material unwinding and inspecting step when the production process was stopped, e.g., a part of the film which part is unwound first serves as a lead of a product.

Given these circumstances, in a case where the production process is restarted, the time T1 is set at a time at which the part of the film which part is unwound first starts to be subjected to the drying step.

The arrangement makes it possible to obtain a uniform film characteristic from a lead of a product.

Note that as in the case of the example of stoppage 1, the time T1 can also be set at a time different from the time at which the part of the film which part is unwound first starts to be subjected to the drying step. For example, the time T1 can be set at a time at which a part of the film which part is posterior to the part of the film which part is unwound first and in which part a thickness of the coating material with which the base material has been coated in the (b) coating material coating step is made stable, or a part of the film in which part a thickness of the functional layer which has been subjected to the (c) deposition step is made stable starts to be subjected to the drying step.

The time T1 can also be set at a time at which a position on the film which position is anterior to the part of the film which part is unwound first starts to be subjected to the drying step. For example, the time T1 can also be set at a time at which a part of the film which part has finished being subjected to the (d) washing step, or a part of the film which part has finished being subjected to the (e) water removing step starts to be subjected to the drying step. This part is a part of the film from which part the washing liquid starts to adhere to the film in a large amount. As described earlier, heat that is taken away during the drying step is largely due to heat of vaporization which heat is generated during drying of the washing liquid. Thus, in a case where the time T1 is set at a time at which the above part of the film starts to be subjected to the drying step, it is possible to more promptly achieve the equilibrium state.

(Curling Amount)

Next, a curling amount W of a produced film is described below with reference to FIGS. 8 through 11.

Figure 8:
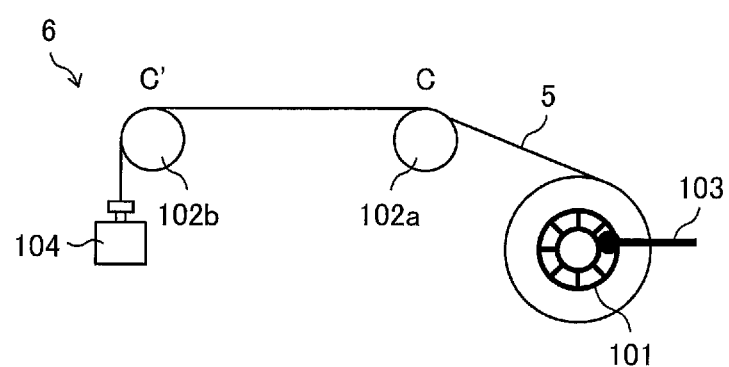
FIG. 8 schematically illustrates a curling amount measuring device of Example.

FIG. 8 schematically illustrates a measuring device of the present embodiment for use in measurement of the curling amount W of the produced film.

A measuring device 6 includes a core 101, a roller 102a and a roller 102b, a stopper 103, and a weight 104.

The roller 102a and the roller 102b are provided so as to be parallel with a width direction of a film 5 and be spaced from each other in parallel with a longer side direction of the film 5. In this case, a distance between C and C' (a length between C and C') is 27.5 cm where C is a point of contact between the roller 102a and the film 5, and C' is a point of contact between the roller 102b and the film 5.

First, the film 5 produced by the production process (described earlier) is slit and then wound with the functional layer side faceup. The film is slit so as to have a width of, for example, 58 mm to 62 mm.

The curling amount W is measured by unwinding the film 5 from the core 101 under conditions of a temperature of 23° C. and a relative humidity of 50% so that the film 5 passes through the roller 102a and the roller 102b in this order. After the film 5 has been unwound, the core 101 is fixed by use of the stopper 103 so as not to rotate, and a weight is provided to a tip of the film 5. In this case, a mass of the weight is determined so that a tension is applied to the film 5 at 90 N/m.

Figure 9:
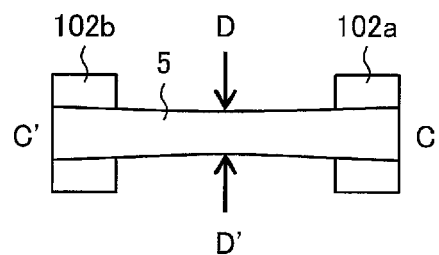
FIG. 9 is an enlarged view of CC' illustrated in FIG. 8 and seen from above.

FIG. 9 is an enlarged view of a space, seen from above, between (a) C, which is a point of contact between the roller 102a and the film 5 of FIG. 8, and (b) C', which is a point of contact between the roller 102b and the film 5 of FIG. 8.

Since the roller 102a and the roller 102b are provided so as to be parallel with each other, the length between C and C' is equal to a distance between centers of the two rollers, i.e., an interval between the rollers.

In this case, the film 5 curls toward the functional layer side.

(Principle of Occurrence of Curling)

A principle of occurrence of curling is described below with reference to FIG. 10.

Figure 10:
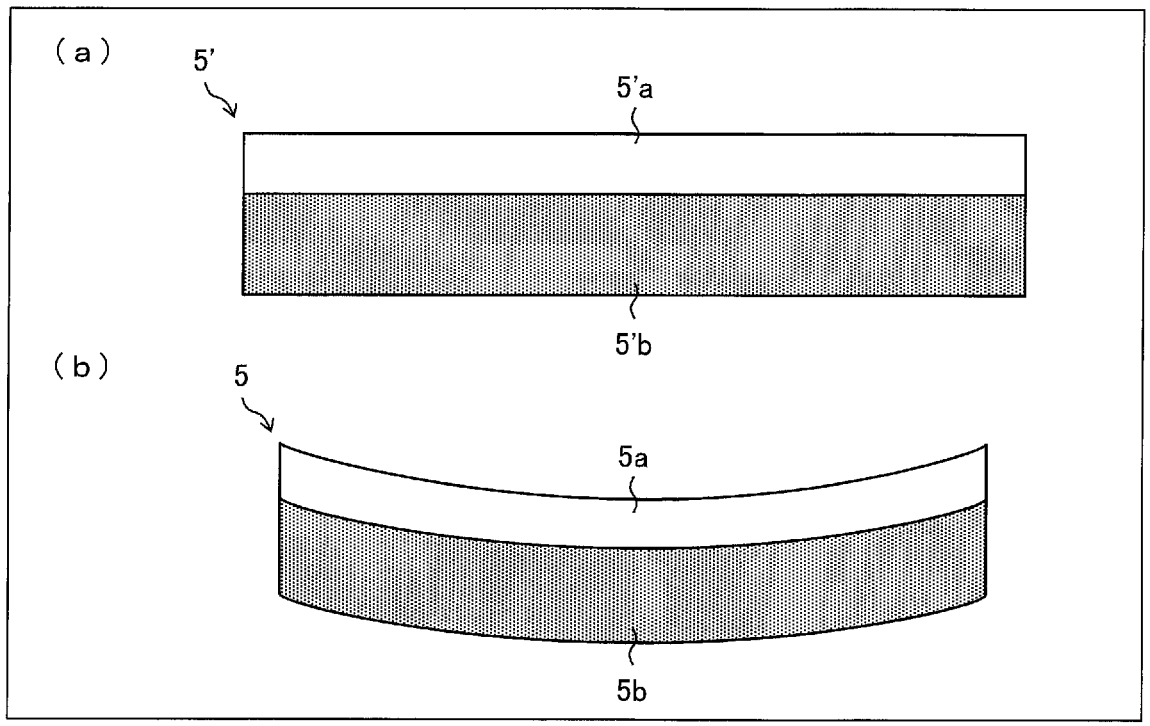
FIG. 10 is cross-sectional views of a film for explaining a principle of occurrence of curling.

FIG. 10 is cross-sectional views of the film 5 for explaining the principle of occurrence of curling.

A film 5' of (a) of FIG. 10 shows a structure obtained in a case where no curling occurs in the film 5, e.g., in a case where the film 5 has not been subjected to the drying step.

The film 5' includes a functional layer 5'a and a base material 5'b. The functional layer 5'a includes, for example, a heat-resistant layer. Normally, the base material 5'b is coated with the functional layer 5'a.

The functional layer 5'a which has not been dried contains a washing liquid (or a solvent). Thus, in a case where the film 5' is heat-treated in the drying step, the washing liquid (or the solvent) evaporates, so that the functional layer 5'a attempts to shrink.

Note, however, that since the functional layer 5'a shrinks under control of the base material 5'b, a force by which the base material 5'b is to shrink toward the functional layer 5'a side is also exerted on the base material 5'b.

In a case where shrinkage thus occurs, it is possible to obtain the film 5 shown in (b) of FIG. 10.

The film 5 of (b) of FIG. 10 shows a structure obtained after the film 5' has curled. The film 5 includes a functional layer 5a and a base material 5b. The functional layer 5a is the functional layer 5'a which has been dried, and the base material 5b is the base material 5'b which has been dried.

Note here that the base material 5b shrinks as in the case of the functional layer 5a. This is because a base material has a characteristic of shrinking by being heat-treated.

Note, however, that the base material 5b less shrinks than the functional layer 5a, which shrinks in response to the drying. Thus, the film 5 greatly curls toward the functional layer 5a side.

In the drying step, curling in the film 5 can be reduced in a case where the base material 5b is also sufficiently heat-treated. This is because the base material 5b which is sufficiently heat-treated more shrinks, so that a difference between the shrinkage in the base material 5b and the shrinkage in the functional layer 5a is narrowed. Note, however, that in a case where it is impossible to obtain a sufficiently enhanced drying condition, shrinkage that is sufficiently enough to reduce curling in the film 5 does not occur in the base material 5b.

As described earlier, the film 5 of FIG. 9 is deformed toward the functional layer side. Thus, the film 5 which is seen from above has a part that is apparently narrow.

In a case where the film 5 is seen from above, edges of a place that seems to be narrowest in a space between C and C' are D and D', respectively, as illustrated in FIG. 9.

In a case where the film 5 has a narrower apparent width at a position, the film 5 has a larger curling amount at that position. Thus, DD' is a place where the film 5 has the largest curling amount in the space between C and C'.

Figure 11:
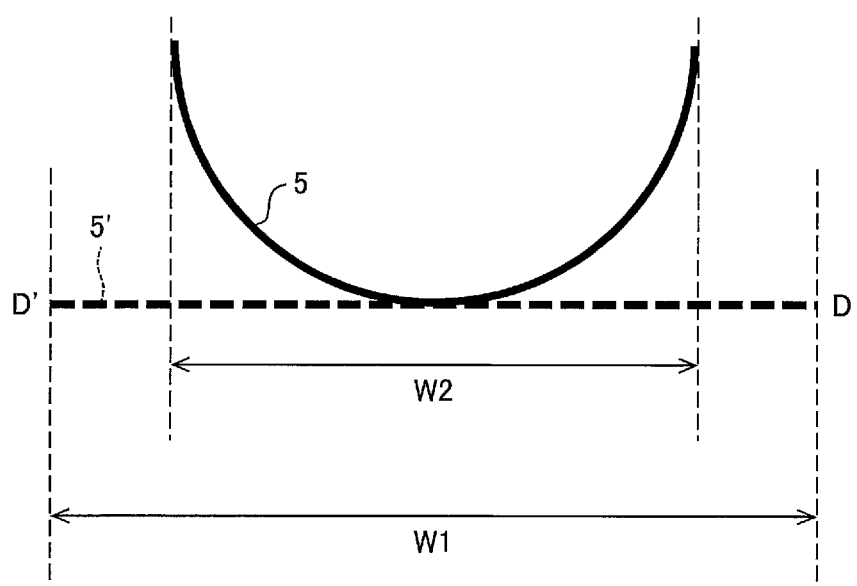
FIG. 11 is a cross-sectional view of DD' illustrated in FIG. 9 and seen in a direction in which CC' of FIG. 9 extends.

FIG. 11 is a cross-sectional view of DD' illustrated in FIG. 9 and seen in a direction in which CC' of FIG. 9 extends.

As illustrated in FIG. 11, the film 5 curls toward the functional layer side, which is the upper surface side of the film 5. This causes the film 5 which is seen from above to have a narrow apparent width.

The film 5' shown with a broken line indicates a shape obtained in a case where the film 5 does not curl.

W1 and W2 are determined as shown in FIG. 11. Specifically, it is determined that W1 is a width of the film 5' and W2 is a projection width of a part of the film 5 which part most curls, the projection width being obtained when the part is seen from a direction perpendicular to a surface of the film. In this case, since the film 5' and the film 5 are equal in width, W1 can be set as a width of the film 5.

The curling amount W is thus found based on the following equation (1):

$$\text{Curling amount } W = W1 - W2 \quad (1)$$

A method for measuring W1 and W2 is not particularly limited. Examples of the method include a measurement method by use of an optical width measuring device, a measurement method by use of ultrasonic waves, a measurement method by use of vernier calipers, and the like.

A film that less curls is more handleable while being laminated to an electrode. Further, a film that less changes in size of curling depending on a position thereon is more handleable. This is because handling of a film that is being loaded varies depending on a size of curling.

Since greater curling causes W2 to have a smaller value, greater curling causes an increase in curling amount W in accordance with the above equation (1).

That is, the curling amount W quantitatively shows a size of curling in the film 5. This makes it possible to say that the film 5 which has a smaller curling amount W is less deformed and that the film 5 which less changes in curling amount W depending on a position thereon less varies in deformation depending on a position thereon.

(Results of Measurement of Curling Amount W)

TABLE 1

| Coating flow length (m) | Conventional Example | | Example | |
|---|---|---|---|---|
| | Measured width (mm) | Curling amount (mm) | Measured width (mm) | Curling amount (mm) |
| 0 | 59.58 | 0.18 | 59.48 | 0.25 |
| 100 | 59.57 | 0.19 | 59.48 | 0.25 |
| 200 | 59.57 | 0.19 | | |
| 300 | 59.57 | 0.19 | 59.45 | 0.28 |
| 400 | 59.57 | 0.19 | | |
| 500 | 59.53 | 0.23 | | |
| 600 | 59.51 | 0.25 | 59.45 | 0.28 |
| 700 | 59.5 | 0.26 | | |
| 800 | 59.48 | 0.28 | 59.48 | 0.25 |
| 900 | | | | |
| 1000 | | | 59.45 | 0.28 |
| 1100 | 59.47 | 0.29 | 59.46 | 0.27 |
| 1200 | | | 59.47 | 0.26 |
| 1300 | | | 59.47 | 0.26 |
| 1400 | 59.48 | 0.28 | | |
| 1500 | 59.48 | 0.28 | | |
| 1600 | 59.48 | 0.28 | 59.45 | 0.28 |
| 1700 | | | | |
| 1800 | | | 59.45 | 0.28 |
| 1900 | 59.45 | 0.31 | | |
| 2000 | 59.44 | 0.32 | 59.45 | 0.28 |
| Average | | 0.25 | | 0.27 |
| Standard deviation | | 0.049 | | 0.013 |
| Coefficient of variation | | 0.197 | | 0.050 |

Table 1 shows curling amounts W obtained in a case where measurement was carried out, by use of the measuring device 6 (see FIG. 8), with respect to (i) the film 5 which was subjected to the drying step carried out in Conventional Example and (ii) the film 5 which was subjected to the drying step carried out in Example. Note that of a plurality of films (a roll) obtained by slitting, a film that is located at a center in a width direction of a film that has not been slit into the plurality of films is used for the measurement.

The item "Conventional Example" shows measured values of the film 5 which was produced through the drying step carried out in Conventional Example, i.e., the drying step in which the drying condition was fixed. The item "Example" shows measured values of the film 5 which was produced through the drying step carried out in Example, i.e., the drying step in which the drying condition was changed with time. The item "Coating flow length (m)" shows a distance between (a) a position on the film which position serves as a lead part of a product (a part from which coating was started) and (b) a position on the film at which position the measurement was carried out. That is, "Coating flow length (m)" shows at which position on the film 5 the measurement was carried out. The item "Measured width (mm)" shows W2, which was actually measured, in the above equation (1). The item "Curling amount (mm)" shows a curling amount W calculated from the measured width measured. The item "Average" shows an average of curling amounts W obtained in each of Conventional Example and Example. The item "Standard deviation" shows a standard deviation of a curling amount W obtained in each of Conventional Example and Example. The item "Coefficient of variation" shows a coefficient of variation σ, which is a value obtained by dividing the standard deviation of the curling amount W by the average in each of Conventional Example and Example. That is, the coefficient of variation a shows a variation in curling amount depending on a position on the film 5.

Note that W1 of Conventional Example is 59.76 mm and W1 of Example is 59.73 mm.

The film 5 obtained in Example was subjected to the measurement carried out for a length of 2000 m at 12 positions which were arranged in a longer side direction of the film at intervals of an integral multiple of 100 m and in which a distance between positions that were most distant from each other was not shorter than 100 m and not longer than 300 m.

(Change in Curling Amount W)

Figure 12:
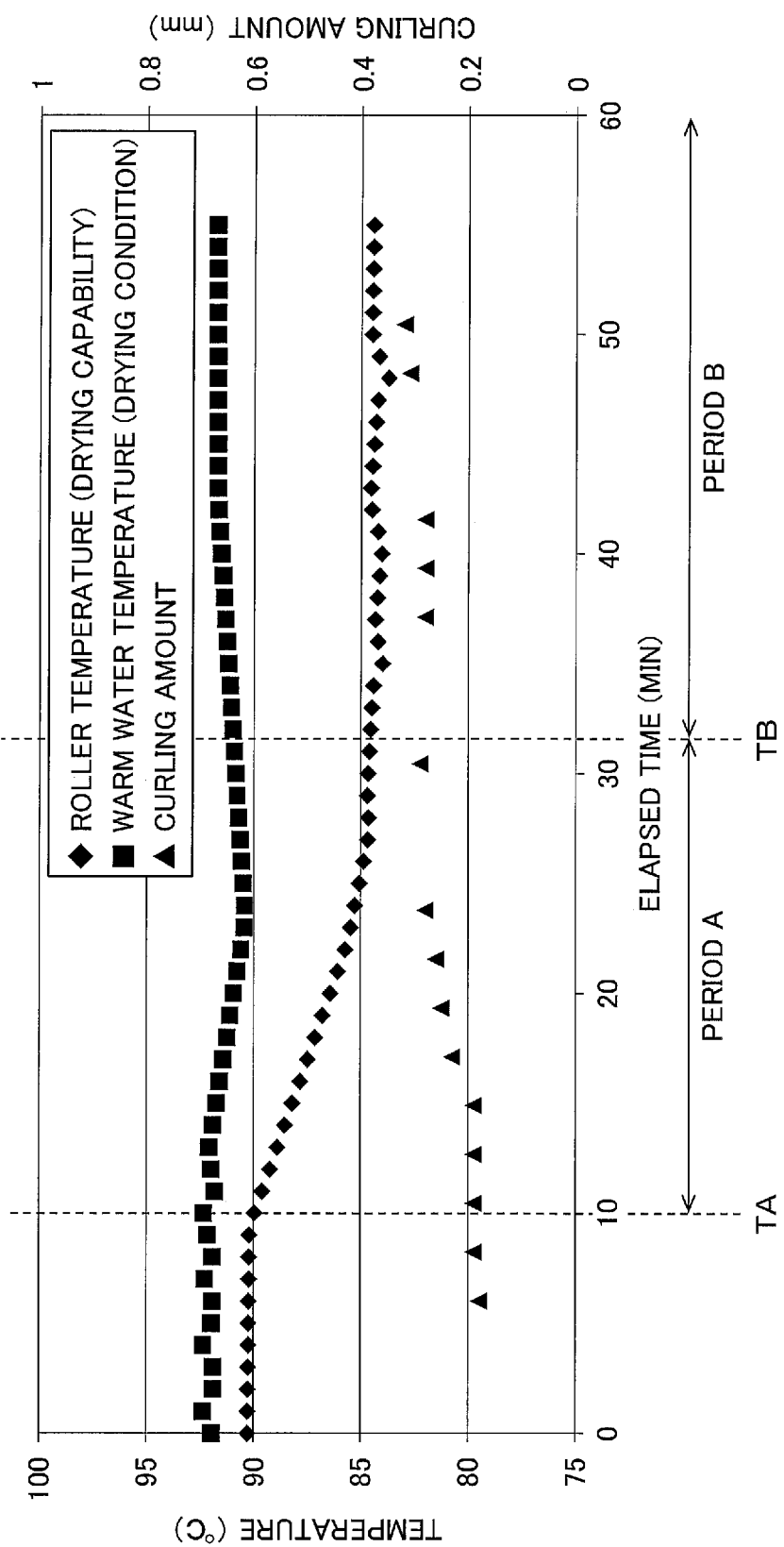
FIG. 12 shows a change in curling amount W of Conventional Example.
Figure 13:
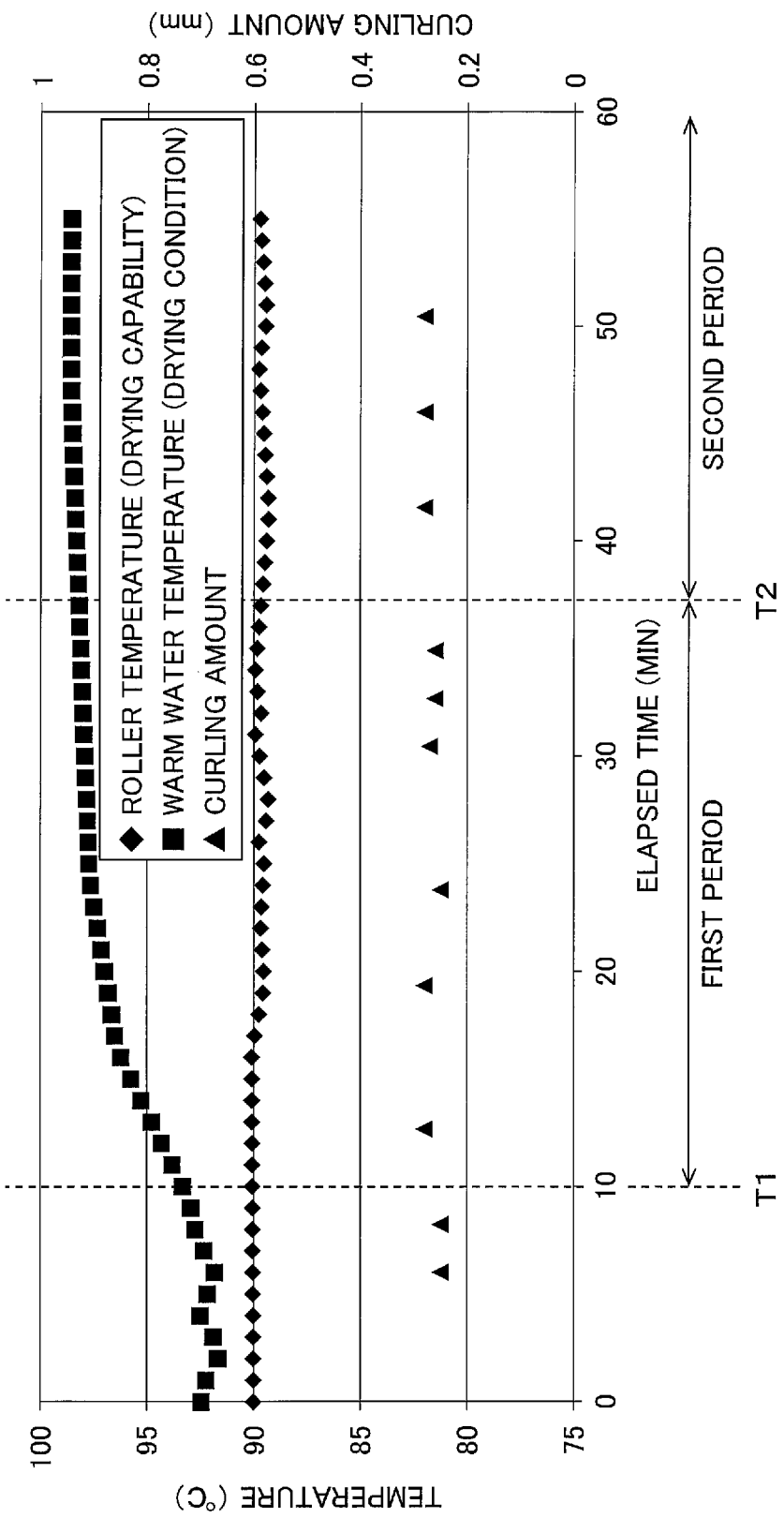
FIG. 13 shows a change in curling amount W of Example.

FIG. 12 shows, together with the roller temperature and the warm water temperature, a change with elapsed time in curling amount W of the film 5 which was subjected to the measurement in Conventional Example. FIG. 13 shows, together with the roller temperature and the warm water temperature, a change with elapsed time in curling amount W of the film 5 which was subjected to the measurement in Example.

As shown in FIG. 12, the film 5 of Conventional Example starts to increase in curling amount W in the middle of the period A, i.e., a period in which the roller temperature decreases. As a result, the film 5 greatly changes in curling amount W with elapsed time. This suggests that a decrease in roller temperature affects a physical property of the film 5.

Meanwhile, as shown in FIG. 13, the film 5 of Example less changes in curling amount W with elapsed time than the film 5 of Conventional Example. This suggests that it is contributive to stabilization of a physical property of the film 5 to maintain the roller temperature constant by an increase in warm water temperature in the first period.

(Effect of Present Embodiment)

As is clear from Table 1, the film 5 which was subjected to the drying step carried out in Conventional Example has the coefficient of variation a with respect to the curling amount W of 0.197, and the film 5 which was subjected to the drying step carried out in Example has the coefficient of variation a with respect to the curling amount W of 0.050.

It is thus revealed that the film 5 which was subjected to the drying step carried out in Example has a smaller coefficient of variation a with respect to the curling amount W than the film 5 which was subjected to the drying step carried out in Conventional Example.

That is, it is revealed that as compared with the film which was subjected to the drying step carried out in Conventional Example, the film which was subjected to the drying step carried out in Example less changes in curling amount W depending on a position thereon and has no or less great (i.e., ignorable-level) need to appropriately adjust handling of the film in accordance with the curling amount so as to laminate the film to an electrode.

The film 5 which was subjected to the drying step carried out in Conventional Example has a maximum curling amount W of 0.32 mm, and the film 5 which was subjected to the drying step carried out in Example has a maximum curling amount W of 0.28 mm.

That is, it is revealed that as compared with the film which was subjected to the drying step carried out in Conventional Example, the film which was subjected to the drying step carried out in Example has a smaller maximum curling amount W and is more handleable while being laminated to an electrode.

The above results of measurement show that the present embodiment makes it possible to obtain the film 5 in which the coefficient of variation a with respect to the curling amount W found based on the equation (1) and measured for a length of 2000 m at 12 positions in which a distance between positions that are most distant from each other is not shorter than 100 m and not longer than 300 m is not more than 0.15, and the curling amount W thus found has a maximum value of not more than 0.3.

A battery separator film produced through the drying step described in Example satisfies the above conditions and is highly handleable while being laminated to an electrode. Thus, such a battery separator film is preferably used as a nonaqueous electrolyte secondary battery separator.

A nonaqueous electrolyte secondary battery that is produced by use of a nonaqueous electrolyte secondary battery separator is so excellent as to have a high load characteristic and allow the separator to carry out an excellent shutdown function.

(Conclusion)

As described earlier, it is revealed in the present embodiment that the film which was subjected to the drying step carried out in Example allows a further reduction in variation in curling amount W than the film which was subjected to the drying step carried out in Conventional Example.

This is (i) because in the drying step carried out in Example, a decline in drying capability is prevented by gradually enhancing the drying condition and consequently the drying capability is maintained substantially constant and (ii) because the heat amount achieves the equilibrium state in the drying step at an end of the first period and consequently a fixed drying condition can be achieved irrespective of a position on the film.

A state in which the drying capability is constant refers to, for example, a state in which an amount of change in roller temperature is maintained so as to fall within 3° C. According to an aspect of the present invention, an amount of change in roller temperature serving as the drying capability is maintained so as to fall preferably within 2° C., more preferably within 1° C.

It is also revealed in the present embodiment that the film which was subjected to the drying step carried out in Example allows a further reduction in maximum curling amount W than the film which was subjected to the drying step carried out in Conventional Example.

This is because of the reasons below. Specifically, as compared with the drying step carried out in Conventional Example, according to the drying step carried out in Example, the roller temperature does not fall below an assumed drying condition, so that a sufficiently enhanced drying capability is obtained. This causes the base material to be also heat-treated and consequently allows prevention of deformation (curling) in the film 5 by causing shrinkage not only in the functional layer but also in the base material.

Further, the drying step carried out in Example makes it easy to obtain an assumed drying capability. Thus, it is possible to set a drying condition necessary for shrinkage in the base material and actually apply the set drying condition to the drying step carried out in Example.

(Effect)

As compared with Conventional Example, the present embodiment achieves a film that less varies in curling amount depending on a position thereon and has a lower maximum curling amount.

The present embodiment also achieves a film that less curls due to shrinkage in a base material which has been subjected to a heat treatment necessary for shrinkage in the base material.

Thus, it is possible to obtain a film that is highly handleable while being laminated to an electrode.

Further, the drying step makes it possible to obtain a drying capability that is assumed by a person who works Example. This makes it easy in the drying step to (i) set a drying condition under which to carry out a heat treatment for causing shrinkage not only in the functional layer of the film but also in the base material of the film and (ii) actually carry out the heat treatment.

A battery separator film produced through the drying step described in Example satisfies the above conditions and is highly handleable while being laminated to an electrode. Thus, such a battery separator film is preferably used as a nonaqueous electrolyte secondary battery separator.

A nonaqueous electrolyte secondary battery that is produced by use of a nonaqueous electrolyte secondary battery separator is so excellent as to have a high load characteristic and allow the separator to carry out an excellent shutdown function.

INDUSTRIAL APPLICABILITY

The present invention can be used for a process for producing a film, especially a functional film.

REFERENCE SIGNS LIST

1 Lithium ion secondary battery
4 Heat-resistant layer (functional layer)
5 Film (battery separator film)
5a Functional layer (after drying)
5b Base material (after drying)
5' Film (having no curl)
5'a Functional layer (before drying)
5'b Base material (before drying)

6 Measuring device
11 Cathode
12 Separator (base material)
12a Heat-resistant separator (functional layer-attached separator)
13 Anode
101 Core
102a, 102b Roller
103 Stopper
104 Weight

The invention claimed is:

1. A film production method comprising a film drying step, wherein:
the drying step comprises setting a drying temperature of a heating medium at which to carry out the drying step, for each of at least two periods, a first period and a second period later than the first period;
a set value of the drying temperature is changed in at least a part of the first period so as to be increased with time; and
the set value is maintained in the second period so as to be substantially fixed; and
an actual drying temperature of the film is consequently constant throughout the first period and the second period.

2. The film production method as set forth in claim 1, wherein a decline in actual drying temperature of the film demonstrated in the drying step, the decline being caused by absorption of heat during the drying of the film, is prevented by changing the set value in the first period so that the set value is increased.

3. The film production method as set forth in claim 2, wherein:
the actual drying temperature of the film is maintained constant in the first period by changing the set value in the first period so that the set value is increased;
the actual drying temperature of the film is maintained constant in the second period by causing the absorption of heat and application of heat to the drying step to reach equilibrium at an end of the first period; and
the actual drying temperature of the film is consequently constant throughout the first period and the second period.

4. The film production method as set forth in claim 1, wherein a time at which the first period starts is set so that a lead part of the film which is to be formed into a product starts to be subjected to the drying step at the time.

5. The film production method as set forth in claim 1, wherein:
the drying is carried out by bringing the film into contact with a roller that is heated; and
the set value is a set value of a heating medium to be poured into the roller.

6. The film production method as set forth in claim 1, wherein an operation of the production process includes a restart of the production process which is stopped.

7. The film production method as set forth in claim 1, wherein the film is a battery separator.

8. The film production method as set forth in claim 1, wherein in the drying step, deformation in the film is prevented by carrying out a heat treatment so as to cause shrinkage not only in a functional layer of the film but also in a base material of the film.

* * * * *